(12) United States Patent
Oizumi et al.

(10) Patent No.: US 10,354,519 B2
(45) Date of Patent: *Jul. 16, 2019

(54) COMMUNICATION SYSTEM, APPARATUS AND METHOD

(71) Applicant: NINTENDO CO., LTD., Kyoto (JP)

(72) Inventors: Toshiki Oizumi, Kyoto (JP); Shumpei Yasuda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,484

(22) Filed: Aug. 7, 2018

(65) Prior Publication Data

US 2018/0350228 A1 Dec. 6, 2018

Related U.S. Application Data

(63) Continuation of application No. 15/401,730, filed on Jan. 9, 2017, now Pat. No. 10,074,269.

(51) Int. Cl.
*H04L 12/24* (2006.01)
*H04L 29/06* (2006.01)
(Continued)

(52) U.S. Cl.
CPC ............ *G08C 17/02* (2013.01); *A63F 13/211* (2014.09); *A63F 13/235* (2014.09); *G07C 5/085* (2013.01);
(Continued)

(58) Field of Classification Search
CPC .. G06F 2203/015; G06F 3/016; G06F 3/0338; G08C 17/02; G08C 2201/12;
(Continued)

(56) References Cited

U.S. PATENT DOCUMENTS

| 6,574,311 B1 * | 6/2003 | Ross | H04M 1/24 379/1.04 |
|---|---|---|---|
| 7,573,853 B2 | 8/2009 | Saifuddin | |

(Continued)

FOREIGN PATENT DOCUMENTS

WO 00/59594 10/2000

OTHER PUBLICATIONS

Bluetooth Special Interest Group: "Bluetooth Human Interface Device (HID) Profile Specifications," Bluetooth Adopted Specification Web page, Feb. 21, 2012, pp. 1-123, XP055133797, retrieved from the Internet: URL:https://www.bluetooth.org/en-us-specification/adopted-specifications [retrieved Aug. 7, 2014].

(Continued)

*Primary Examiner* — Dionne Pendleton
(74) *Attorney, Agent, or Firm* — Nixon & Vanderhye, P.C.

(57) ABSTRACT

An example remote control device includes an inertial sensor; one or more manipulable input devices; wireless communication circuitry; and control circuitry for controlling the wireless communication circuitry to communicate information about the inertial sensor and the input devices to an electronic device. The information is communicated at one or more communication intervals using a data format which permits a value associated with the inertial sensor and sampled at a given sampling time to be communicated in at least first and second different communications.

30 Claims, 8 Drawing Sheets

(51) Int. Cl.
*H04W 52/02* (2009.01)
*G08C 17/02* (2006.01)
*A63F 13/211* (2014.01)
*A63F 13/235* (2014.01)
*G07C 5/08* (2006.01)

(52) U.S. Cl.
CPC ... *H04W 52/0254* (2013.01); *G06F 2203/015* (2013.01); *G08C 2201/32* (2013.01); *G08C 2201/50* (2013.01); *Y02D 70/00* (2018.01); *Y02D 70/10* (2018.01); *Y02D 70/14* (2018.01); *Y02D 70/142* (2018.01); *Y02D 70/144* (2018.01); *Y02D 70/162* (2018.01); *Y02D 70/166* (2018.01)

(58) Field of Classification Search
CPC .......... G08C 2201/50; G08C 2201/32; H04W 52/0254; H04W 52/0274; H04W 52/08; H04W 52/221; H04W 52/225; H04W 52/267; H04W 52/282; H04W 52/283; H04W 52/288; H04W 52/44; H04L 43/08; H04L 67/12; H04L 69/16; H04N 7/181; Y02D 70/1262; Y02D 70/142; Y02D 70/144; Y02D 70/146; Y02D 70/162; Y02D 70/22; Y02D 70/26; Y02D 70/00; Y02D 70/10; Y02D 70/14; Y02D 70/166; A63F 13/24; A63F 13/285; A63F 2300/302; A63F 13/211; A63F 13/235; B64C 2201/024; B64C 2201/127; B64C 2201/146; B64C 39/024; B64D 47/08; G01R 31/3606; G04R 20/02; G05G 2009/04766; G05G 9/047; G07C 5/085
See application file for complete search history.

(56) References Cited

U.S. PATENT DOCUMENTS

| | | |
|---|---|---|
| 2003/0009242 A1 | 1/2003 | Bocchi |
| 2004/0024548 A1* | 2/2004 | Genther ............ G01R 13/0272 702/75 |
| 2009/0054069 A1 | 2/2009 | Calnan, III et al. |
| 2011/0254760 A1 | 10/2011 | Lloyd et al. |
| 2013/0314339 A1 | 11/2013 | Ueki et al. |
| 2013/0314608 A1 | 11/2013 | Ito et al. |
| 2015/0036573 A1* | 2/2015 | Malik ............... H04W 52/0254 370/311 |
| 2015/0222487 A1 | 8/2015 | Ranjekar |
| 2016/0378195 A1 | 12/2016 | Lefebvre |
| 2017/0203206 A1 | 7/2017 | Grant |

OTHER PUBLICATIONS

Extended Search Report dated Sep. 6, 2018 in counterpart European Patent Application No. 17158875.9.
Ranta, Craig, et al., "Human Interface Device (HID) Profile Version 1.0 Adopted," Internet Citation, May 22, 2003, pp. 1-123, XP002697882, Retrieved from the Internet: May 28, 2013.

* cited by examiner

| Report ID | Usecase | Supported Bluetooth Interval | BT Packet Type | Supported UART Interval |
|---|---|---|---|---|
| 0x10 | Basic | 5, 10, 15, Active | 2-DH1 | 5, 10, 15 |

Fig. 6A

| ReportID | Usecase | Supported Bluetooth Interval | BT Packet Type | Supported UART Interval | Button | Analog Stick | 6-axis Sensor | Motor |
|---|---|---|---|---|---|---|---|---|
| 0x30 | Basic | 5, 10, 15, Active | 2-DH1 | 5, 10, 15 | 3 Byte | 6 Byte | 36 Byte | 1 Byte |

Fig. 6B

| byte 0 | HIDP-Hdr | | | | |
|---|---|---|---|---|---|
| byte 1 | Report ID | | | | |
| byte 2 | 0 | 0 | 0 | 0 | HID Sample Number |
| byte 3 - 10 | Motor Parameter | | | | |
| byte 11 | cmd_id | | | | |
| byte 12 - 49 | Command payload | | | | |

Fig. 7A

| byte 0 | HIDP-Hdr |
|---|---|
| byte 1 | Report ID |
| byte 2 | HID Sample Number |
| byte 3 | Battery (3 bits), Attachment (3 bits), Attachment Extra (1bit), Charge (1 bit) |
| bytes 4-6 | 1-bit values for ZL, L, SR-1, SR-2, SL-1, SL-2, Left, Right, Up, Down, Plus, Minus, Right Stick, Left Stick, Home, Record, Null, Powered, ZR, R, A, B, X, Y |
| bytes 7-12 | 12-bit values for each of tilt direction and magnitude of tilt for analog sticks |
| byte 13 | Motor Parameter 1 (4 bits), Motor Parameter 2 (4 bits) |
| bytes 14-19 | Accelerometer X (16 bits), Accelerometer Y (16 bits), Accelerometer Z (16 bits) |
| bytes 20-25 | Gyroscope X (16 bits), Gyroscope Y (16 bits), Gyroscope Z (16 bits) |
| byte 26- 49 | 2nd and 3rd sample data for 6 axis sensor with same data format as bytes 14 - 25 |

Fig. 7B

COMMUNICATION SYSTEM, APPARATUS AND METHOD

CROSS-REFERENCE TO RELATED APPLICATIONS

This application is a continuation of U.S. application Ser. No. 15/401,730, filed Jan. 9, 2017, now U.S. Pat. No. 10,074,269. The entire contents of this application are hereby incorporated by reference in this application.

FIELD

The present disclosure generally describes a communication system for communicating information between two electronic devices and, more particularly, a communication system for communicating information between a remote control device (such as, but not limited to, a game controller) and an information processing device (such as, but not limited to, a video game device).

BACKGROUND AND SUMMARY

The present disclosure relates to a data format for wireless communication between electronic devices. By way of illustration and without limitation, the data format may be used to wirelessly communicate information between one or more remote control devices and an information processing device such as a video game device. For example, information transmitted from the remote control device may be used to control one or more processes of the information processing device. The transmitted information may include information about buttons, keys, joysticks, sensors, etc.

By way of example, a remote control device may include an inertial sensor; one or more manipulable input devices; wireless communication circuitry; and control circuitry for controlling the wireless communication circuitry to communicate information about the inertial sensor and the input devices to an electronic device. The information is communicated at one or more communication intervals using a data format which permits a value associated with the inertial sensor and sampled at a given sampling time to be communicated in at least first and second different communications.

BRIEF DESCRIPTION OF DRAWINGS

FIGS. 6A and 6B show non-limiting example output and input report information, respectively.

FIGS. 7A and 7B show non-limiting example output and input data formats, respectively.

DETAILED DESCRIPTION OF EXAMPLE EMBODIMENTS

The figures discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any of a variety of suitably arranged electronic devices. Hereinafter, example embodiments of the present disclosure are described in detail with reference to the accompanying drawings. In the following description, detailed descriptions of well-known functions or configurations are omitted to avoid unnecessarily obscuring the subject matter of the present disclosure.

The present disclosure relates to data formats for wireless communication between electronic devices. By way of illustration and without limitation, an example data format may be used to wirelessly communicate information between one or more remote control devices and an information processing device such as a video game device. In the case of a video game device, each player manipulates remote control device(s) to provide inputs for, for example, controlling game play for single player or multi-player games. For example, inputs to the remote control devices may be used to control objects (e.g., movements and actions of characters, etc.) in a virtual game world. In some instances, each player may manipulate a single remote control device (e.g., using one or two hands) to provide inputs and, in other instances, each player may manipulate two or more remote control devices (e.g., one in each hand) to provide inputs. Of course, different players playing the same game may use different types or different numbers of remote control devices. Also, it will be readily appreciated that remote control devices are not limited to those that are hand-held by a player. For example, remote control devices may be additionally or alternatively secured to a player's hands, arms, legs, etc. to provide inputs for video game control.

As mentioned, the video game device processes information corresponding to inputs to the remote control devices to control game play of the video game. These inputs to the remote control devices may include, but are not limited to, button presses, manipulations of an analog stick, and orientation changes and/or movement of the remote control devices in three-dimensional (3D) real space. Such orientation changes and movement may be detected using multi-axis inertial sensors such as accelerometers and/or gyroscopes which detect aspects of orientation and/or movement of the remote control device resulting from how the player holds and moves the remote control device in 3D real space. The data formats described herein enable communication of information corresponding to such inputs from one or more remote control devices to a video game device.

Figure 1:
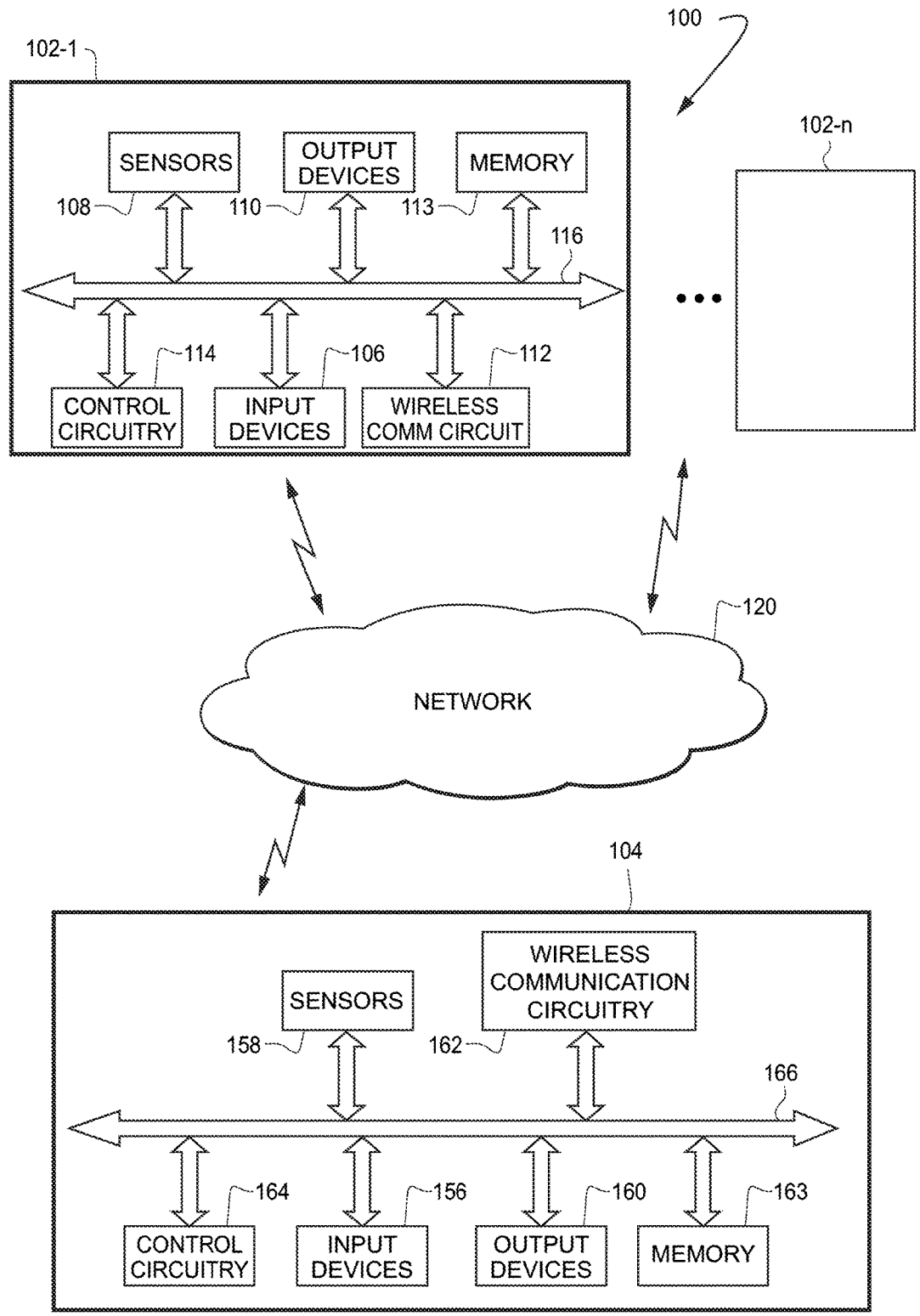
FIG. 1 is a generalized block diagram of a communication system according to a non-limiting example embodiment.

FIG. 1 is a generalized block diagram of a communication system 100 according to a non-limiting example embodiment of the present disclosure. Communication system 100 includes remote control devices 102-1, 102-2, ... 102-n and an information processing device 104. Remote control devices 102 and information processing device 104 communicate with each other (e.g., bidirectional communication) via a communication network 120. As noted above, the information processing device may be an electronic device configured to perform one or more processes or functions (such as video game play) based on an application program executed by the information processing device and inputs to the remote control devices supplied by one or more users. Of course, the present disclosure is not limited to video games and, more generally, the information processing device may be any type of electronic device whose operations are controlled, at least partly, based on inputs supplied to one or more remote control devices. Examples of such information processing devices include televisions; set-top boxes; cameras (video and still); radio-controlled drones; audio equipment; speakers; radios; lighting; garage doors; automobiles; recording/playback devices (e.g., digital video recorders); computers; audio/visual (AV) equipment; heating, ventilation and air conditioning (HVAC) equipment; ceiling fans; security systems; locks; alarm systems; thermostats; and the like. Consequently, even though the description herein relates to a video game device, it will be readily appreciated that the present disclosure is widely applicable to many different types of electronic devices.

As shown in FIG. 1, each remote control device 102 includes one or more input devices 106 (e.g., for manipulation by a user's fingers), one or more sensors 108, one or more output devices 110, wireless communication circuitry 112, memory 113, and control circuitry 114. Bus 116 and/or other communication paths (not shown) allow communication among these various components (via appropriate interfaces, if necessary).

Examples of input devices 106 include, but are not limited to, buttons, keys, sliders, joysticks, analog sticks, touch pads, touch panels, and the like. The input devices may be physically arranged to allow convenient manipulation by a user holding the remote control device with one or with two hands. Information corresponding to inputs supplied to these input devices 106 (e.g., button states, keypresses, etc.) may be periodically communicated to information processing device 104 via communication network 120. This input information may be used by one or more processes performed by information processing device 104 under control of control circuitry 164. For example, when the information processing device is executing a video game application program, the input information may be used to control game objects in a three-dimensional (3D) virtual game world.

Examples of sensors 108 include, but are not limited to, inertial sensors (e.g., accelerometers, gyroscopes, angular velocity sensors, etc.), magnetometers, cameras, image sensors, light sensors and the like. The inertial sensors can detect aspects of orientation and/or movement of the remote control device. Information corresponding to sensors 108 (e.g., sensor values) may be periodically communicated to information processing device 104 via communication network 120. This sensor information may be used by one or more processes performed by the information processing device. For example, when the information processing device is executing a video game application, the sensor information may be used to control game objects in a 3D virtual game world.

Examples of output devices 110 include, but are not limited to, displays, selectively illuminated indicators (e.g., LEDs), speakers, and tactile devices such as one or more vibration motors. Such output devices may be controlled by the control circuitry 114. The control may be implemented locally by control circuitry 114 and/or be based on information received by the remote control device from information processing device 104 over wireless communication network 120. For example, information processing device 104 may transmit motor control signals for controlling one or more vibration motors included in the remote control device to thereby provide various tactile sensations to a user holding the remote control device. In addition, the remote control device may transmit vibration motor information (e.g., state information) to the information processing device. Information processing device 104 may also transmit information for visual and/or aural output via a display and/or speaker(s) of the remote control device.

Wireless communication circuitry 112 enables wireless communication between remote control device 102 and information processing device 104 in accordance with one or more communication standards such as Bluetooth, Wi-Fi, ultra wideband (UWB), wireless USB and Zigbee. Other communication standards for near field, short-distance, and long-distance communication may also be used and the present disclosure is not limited in this respect. Wireless communication circuitry 112 may also enable internet communication, for example, via a wireless connection to an access point (not shown).

Memory 113 (e.g., non-transitory memory such as flash, EPROM, EEPROM, magnetic memory, optical memory, magneto-optical memory, and the like) provides storage for the operations of remote control device 102. The memory may store and operating system, firmware and/or software which is executable by control circuitry 114 for controlling operations of the remote control device. Memory 113 may also store information about the states of buttons, keys, sticks, etc., as well as values from the sensors 108, prior to communication to information processing device 104. Memory 113 may also be used to store information for the output devices 110 (e.g., video information, audio information, motor control information, and the like received from information processing device 104).

Control circuitry 114 controls operations of the remote control device. The control circuitry may include, for example, logic circuitry, application specific integrated circuits (ASICs), gate arrays (e.g., floating point gate arrays), controllers, microcontrollers, processors, microprocessors, CPUs, dedicated hardware, and combinations thereof. As will be readily appreciated and understood, various operations described herein may be performed by the control circuitry executing firmware or software and/or by dedicated hardware circuitry included in the control circuitry. By way of example and without limitation, remote control devices 102 may include serial flash memory storing updateable firmware which is executable by a microcontroller for performing some or all of the various operations described herein. The firmware may be updated by communications from information processing device 104.

It is not necessary that each of the remote control devices 102 have the same physical or electrical configuration. That is, remote control devices 102 can differ in one or more of physical shape; types and numbers of input devices, sensors and output devices; and physical layouts or arrangement of the input devices, sensors and output devices. For example, in a pair of remote control devices, only one of the pair may include a camera or a light sensor or be configured for near-field communication.

Figure 2:
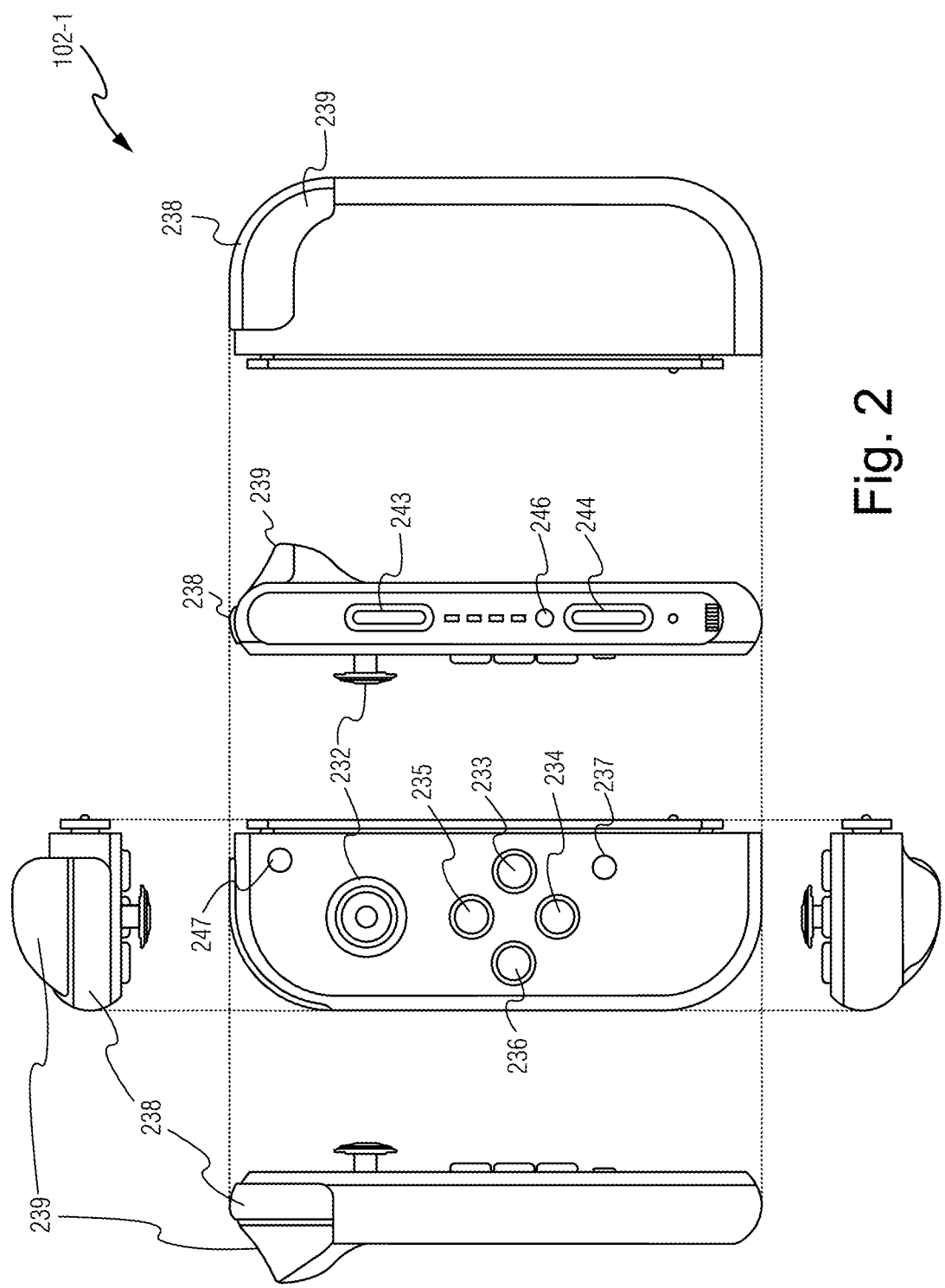
FIG. 2 shows a non-limiting example remote control device.
Figure 3:
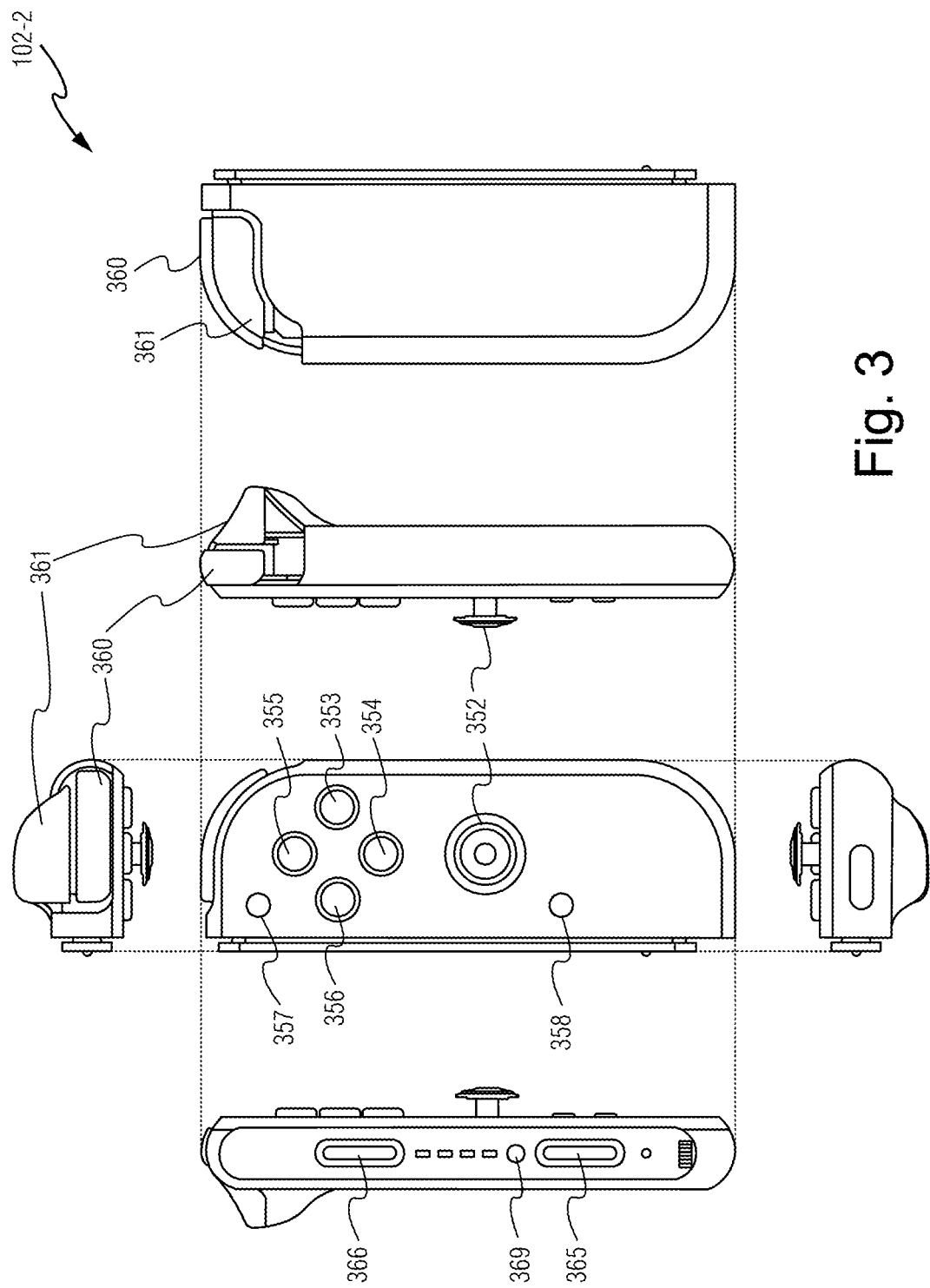
FIG. 3 shows another non-limiting example remote control device.

Non-limiting examples of remote control devices (e.g., remote control devices 102-1 and 102-2) are shown in FIGS. 2 and 3. Specifically, FIG. 2 shows an example remote control device 102-1 and FIG. 3 shows an example remote control device 102-2. Each of remote control devices 102-1 and 102-2 may be used by different players so that each player can provide inputs for use by information processing device 104. Alternatively, remote control devices 102-1 and 102-2 can be used simultaneously by the same player. For example, the player may hold or grasp remote control device 102-1 with his/her left hand and remote control device 102-2 with his/her right hand. For some multi-player games, a first player may use a single remote control device while a second player may use two remote control devices. The numbers and types of remote control devices may vary depending on the game, the number of players, the number and type of remote control devices available and other factors.

As shown in FIG. 2, example remote control device 102-1 includes an analog stick 232 (also referred to as StickL in FIG. 7B) for allowing a user to provide a direction input. Analog stick 232 includes a stick member that can be tilted in any direction (i.e., 360 degrees including upper, lower, left, right and diagonal directions). A user can tilt the stick member to make a direction input based on the tilt direction, as well as a magnitude input based on the tilt angle. Remote control device 102-1 includes four operation buttons 233, 234, 235 and 236 (specifically, a right direction button 233, a down direction button 234, an up direction button 235 and a left direction button 236). These operation buttons 233, 234, 235 and 236 are usable to provide inputs in accordance with various programs (e.g., operating system programs and application programs) executed by information processing device 104. For example, the buttons 233, 234, 235 and 236 can be used to provide direction inputs.

Remote control device also includes a record button 237 for allowing a user to input an instruction for saving an image displayed on a display 412 (see FIG. 4) of information processing device 104. For example, when a game image is displayed on display 412, record button 237 can be pressed to save the displayed game image in a memory of information processing device 104.

Remote control device 102-1 also includes a minus (−) button 247 for allowing a user to provide inputs in accordance with various programs executed by information processing device 104 (e.g., operating system programs and application programs). Minus button 247 is usable, for example, as a select button (e.g., a button for moving a selection highlight through different selection items) in game applications.

Remote control device 102-1 includes a first L button 238 and a ZL button 239. As with operation buttons 233, 234, 235 and 236, operation buttons 238 and 239 can be used to provide inputs in accordance with various programs executed by information processing device 104. Remote control device 102-1 also includes a second L (SL-1) button 243 and a second R (SR-1) button 244. These buttons can be used to provide inputs in accordance with various programs executed by information processing device 104.

Remote control device 102-1 includes a pairing button 246 for a pairing process to pair (e.g., by Bluetooth pairing) remote control device 102-1 and information processing device 104. Generally speaking, pairing refers to a connection for information transmission/reception between the remote control device and the information processing device. When pairing is performed, two-way data transmission/reception is enabled between the remote control device and the information processing device. The pairing process may be performed by the control circuitry and the communication circuitry of the respective remote control device and information processing device. Pairing may be performed through Bluetooth, Near Field Communication (NFC), etc.

Remote control device 102-1 includes an acceleration sensor (not shown in FIG. 2) including, for example, an accelerometer. In an example embodiment, the acceleration sensor is a three (3) axis sensor configured to detect the magnitude of the linear acceleration along directions of three predetermined axes (e.g., the x, y, and z axes). In other embodiments, the acceleration sensor may detect acceleration in one axis direction or two axis directions.

Remote control device 102-1 also includes an angular velocity sensor (not shown in FIG. 2) including, for example, a gyroscope. In an example embodiment, the angular velocity sensor is a three (3) axis angular velocity sensor for detecting angular velocity about three predetermined axes (e.g., the x, y, and z axes). In other embodiments, the angular velocity sensor may detect angular velocity about one axis or two axes.

In an example embodiment, the acceleration sensor of remote control device 102-1 is a 3-axis sensor and the angular velocity sensor of remote control device 102-1 is a 3-axis sensor and thus these sensors may be collectively referred to as a six (6) axis sensor.

As shown in FIG. 3, remote control device 102-2 includes an analog stick 352 (also referred to as StickR in FIG. 7B) for allowing a user to provide a direction input. Analog stick 352 may have the same configuration as analog stick 232 of remote control device 102-1. As does remote control device 102-1, remote control device 102-2 includes four operation buttons 353, 354, 355 and 356 (specifically, A button 353, B button 354, X button 355 and Y button 356). These four operation buttons 353, 354, 355 and 356 are configured similarly to the four operation buttons 233, 234, 235 and 236 of remote control device 102-1.

Remote control device 102-2 also includes a plus (+) button 357 which is usable for inputs in accordance with various programs executed on information processing device (e.g., the OS program and application programs). Plus button 357 may be used, for example, as a start button in a game application.

Remote control device 102-2 includes a home button 358 for causing, for example, display of a predetermined menu screen on a display (e.g., display 412—see FIG. 4) of the information processing device. An R button 360 and a ZR button 361, along with a second L (SL-2) button 365 and a second R (SR-2) button 366 are also provided. These buttons are operable to provide inputs in accordance with various programs executed on information processing device 104.

Remote control device 102-2 includes a pairing button 369. As with pairing button 246 of remote control device 102-1, pairing button 369 is operable for inputting an instruction for a pairing process, for example, for pairing remote control device 102-2 with information proceeding device 104.

Remote control device 102-2 includes an acceleration sensor (not shown in FIG. 3) including, for example, an accelerometer. In an example embodiment, the acceleration sensor is a three (3) axis sensor configured to detect the magnitude of the linear acceleration along directions of three predetermined axes (e.g., the x, y, and z axes). In other embodiments, the acceleration sensor may detect acceleration in one axis direction or two axis directions.

Remote control device 102-2 also includes an angular velocity sensor (not shown in FIG. 3) including, for example, a gyroscope. In an example embodiment, the angular velocity sensor is a three (3) axis angular velocity sensor for detecting angular velocity about three predetermined axes (e.g., the x, y, and z axes). In other embodiment, the angular velocity sensor may detect angular velocity about one axis or two axes.

In an example embodiment, the acceleration sensor of remote control device 102-2 is a 3-axis sensor and the angular velocity sensor of remote control device 102-2 is a 3-axis sensor and thus these sensors may be collectively referred to as a six (6) axis sensor.

Additional details about remote control devices 102-1 and 102-2 are provided in U.S. application Ser. No. 15/179,022, which corresponds to U.S. Patent Publication No. 2016/0361641. The contents of the '022 application are incorporated herein in their entirety.

There is no limitation on the shape, the number and the arrangement of the various buttons, sticks and sensors described above for remote control devices 102-1 and 102-2. As another example embodiment, a single remote control device (not shown) holdable by two hands may "combine" some or even all of the features (e.g., buttons and sensors) of remote control devices 102-1 and 102-2. Other example remote control devices may omit at least some of the described buttons of remote control devices 102-1 and 102-2.

Referring back to FIG. 1, information processing device 104 includes one or more input devices 156 (e.g., for manipulation by a user's fingers), one or more sensors 158, one or more output devices 160, wireless communication circuitry 162, memory 163, and control circuitry 164. Bus 166 and/or other communication paths (not shown) allow communication among these various components (via appropriate interfaces, if necessary).

Examples of input devices 156 include, but are not limited to, buttons, keys, sliders, joysticks, sticks, touch pads, touch panels, and the like. Information associated with inputs to these input devices 156 may be used by one or more processes performed by information processing device 104 under control of control circuitry 164. For example, when the information processing device is executing a video game application program, the input information may be used to control game objects in a three-dimensional (3D) virtual game world.

Examples of sensors 158 include, but are not limited to, inertial sensors (e.g., accelerometers, gyroscopes, angular velocity sensors, etc.), magnetometers, cameras, image sensors, light sensors and the like. Among other things, such sensors can be used to detect aspects of orientation and/or movement of the information processing device. Information associated with sensors 108 may be used by one or more processes performed by the information processing device. For example, when the information processing device is executing a video game application program, the input information may be used to control game objects in a 3D virtual game world.

Examples of output devices 160 include, but are not limited to, displays, selectively illuminated indicators (e.g., LEDs), speakers, and tactile devices such as vibration motors. Such output devices may be controlled by the control circuitry 164.

Wireless communication circuitry 162 enables wireless communication between remote control devices 102 and information processing device 104 in accordance with one or more communication standards such as Bluetooth, Wi-Fi, ultra wideband (UWB), wireless USB and Zigbee. Other communication standards for near field, short-distance, and long-distance communication may also be used and the present disclosure is not limited in this respect. Wireless communication circuitry 162 may also enable internet communication, for example, via a wireless connection to an access point 126.

Memory 163 (e.g., non-transitory memory such as flash, EPROM, EEPROM, magnetic memory, optical memory, magneto-optical memory, and the like) provides storage for the operations of information processing device 104. The memory may store an operating system, firmware and/or software (including application programs) which are executable by control circuitry 164 for controlling operations of the remote control device. Memory 163 may also store information received from the remote control devices for use by control circuitry 164, along with information for transmission to the remote control devices. Memory 163 may also be used to store information for the output devices 160 (e.g., video information, audio information, and the like).

Control circuitry 164 controls the overall operation of information processing device 104. The control circuitry may include logic circuitry, application specific integrated circuits (ASICs), gate arrays (e.g., floating point gate arrays), controllers, processors, microprocessors, CPU's and/or combinations thereof. As will be readily appreciated and understood, the various operations described herein may be performed by the control circuitry executing firmware or software and/or by the control circuitry including dedicated hardware circuitry.

Figure 4:
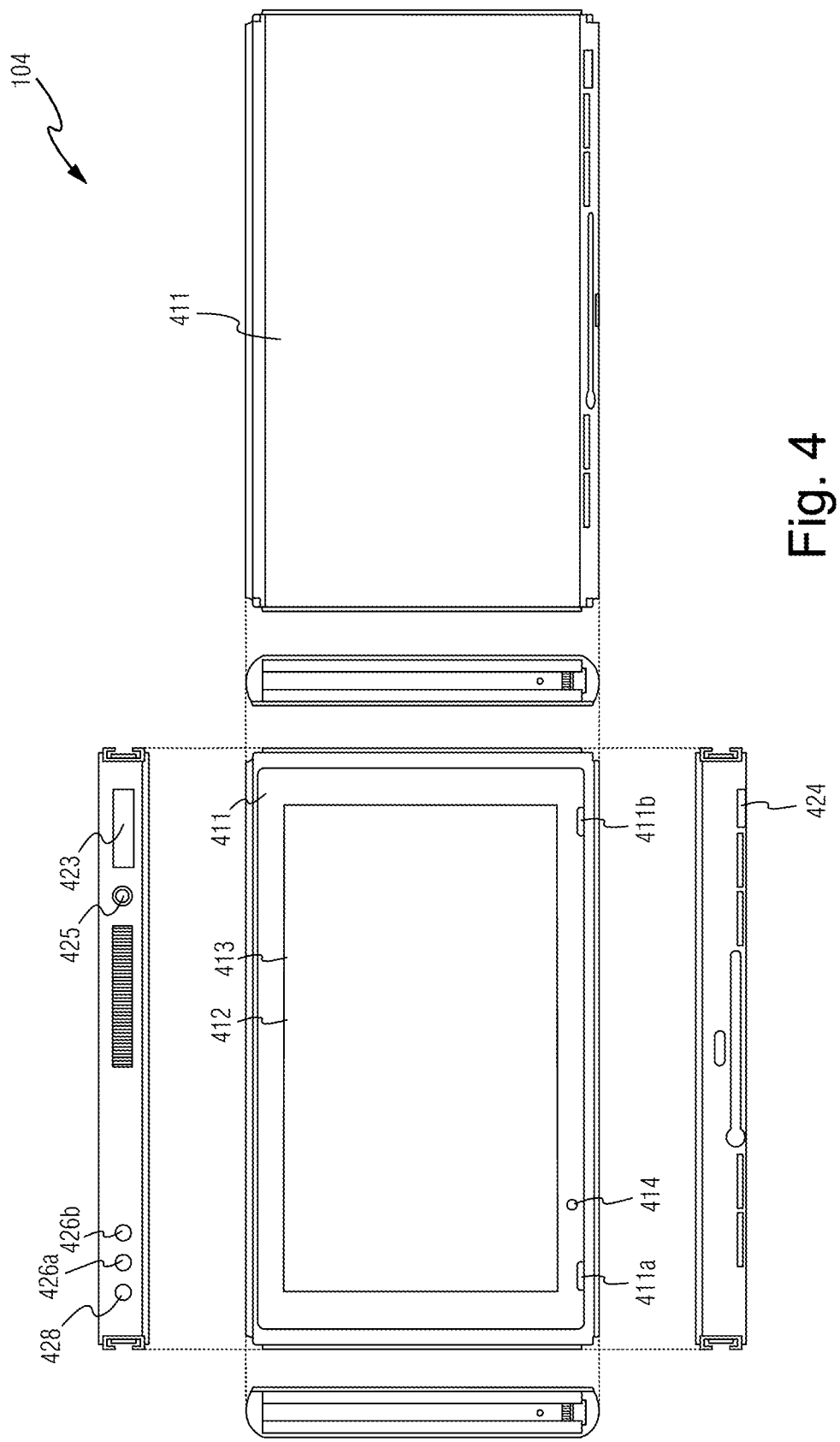
FIG. 4 shows a non-limiting example information processing device.

FIG. 4 shows a non-limiting example of information processing device 104. Information processing device 104 includes a housing 411 having a display 412 (e.g., an LCD display) on a front surface thereof for displaying an image (which may be a still image or a video image) obtained or produced by the information processing device. A touch panel 413 is also provided. By way of example, the touch panel may be of a type (e.g., the capacitive type) that enables a multi-touch input, but the present disclosure is not limited in this respect.

As described in the above-mentioned '022 application, the housing of example information processing device 104 and the housings of remote control devices 102 may each be configured to allow the remote control devices to be physically removably attachable to the information processing device. Details regarding such removeable attachment are provided the '022 application, the contents of which are incorporated herein.

Speaker holes 411a and 411b allow output of sound from a speaker (not shown in FIG. 4) contained in the housing of the information processing device. A window 414 is provided to allow ambient light to be received by an ambient light sensor (not shown in FIG. 4) contained in the housing.

A first slot 423 is provided on the upper side surface of housing 411 and is configured to accommodate a storage medium of a first type such as proprietary memory card for use with the information processing device. The storage medium of the first type is used, for example, for storing information and/or for storing programs to be executed (e.g., application programs, etc.). Control circuitry 164 is configured to have read/write access to the storage medium.

A power button 428 is provided on the upper side surface of the housing 411. The power button 428 is a button for turning ON/OFF the power of the information processing device. A sound input/output terminal (specifically, a jack) 425 enables a microphone or an earphone to be attached to the information processing device. Sound volume buttons 426a and 426b allow adjustment of the volume of the sound output from the information processing device. A second slot 424 is configured to accommodate a storage medium of a second type, which is different from the first type. A storage medium of the second type may be, for example, a general-purpose storage medium, e.g., an SD card. The storage medium of the second type is used for storing information (e.g., application save data, etc.) and/or for storing programs to be executed (e.g., application programs, etc.). Control circuitry 164 is configured to have read/write access to the storage medium.

Additional information about the example information processing device of FIG. 4 can be found in the above-mentioned '022 application, the contents of which are incorporated herein in their entirety.

Various commands and responses thereto can be communicated between information processing device 104 and remote control devices 102. Such commands can, for example, configure remote control devices 102 (e.g., provide settings for vibration motors), update firmware of the remote control devices, or obtain status information from the remote control devices. In a non-limiting example embodiment, a command is a multi-byte packet. In the case of Bluetooth, the command uses 2-DH1 and does not use multiple slots. Each command is specified by a command identifier (e.g., cmd_id of 1 byte).

Figure 5:
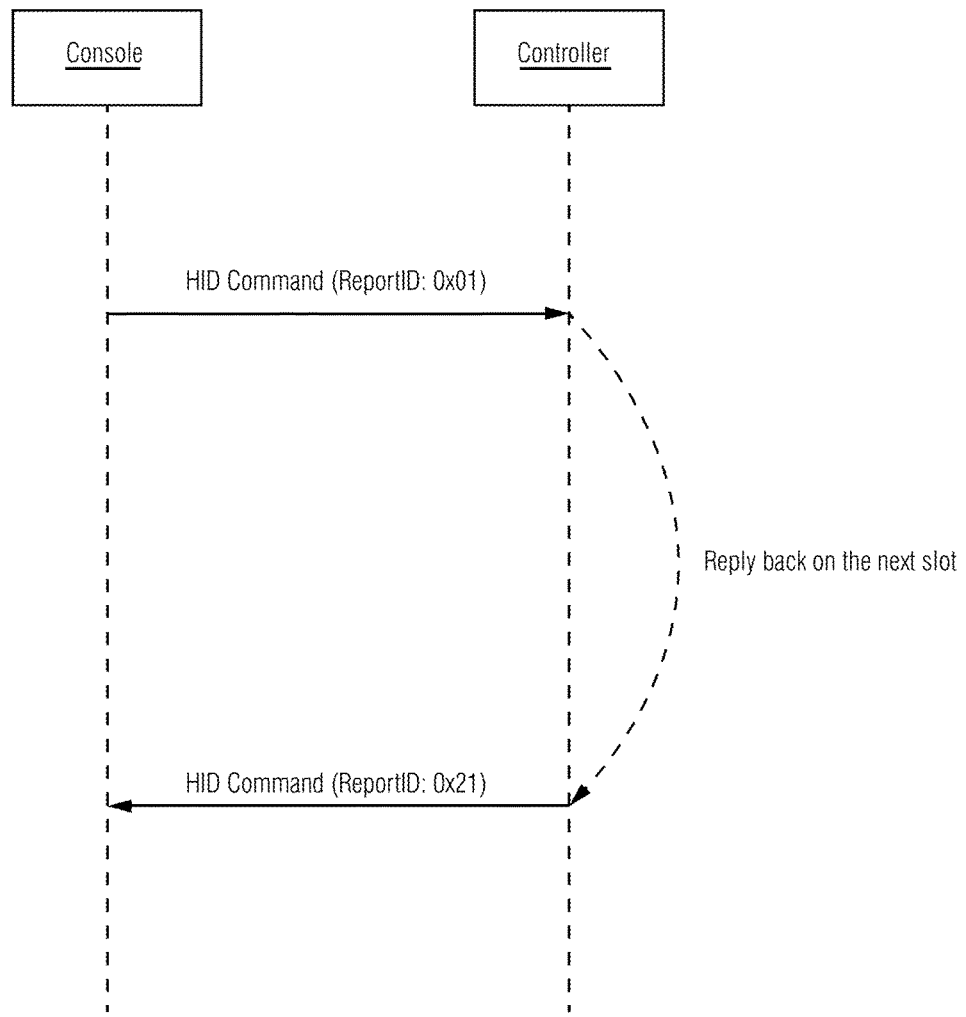
FIG. 5 shows a non-limiting example command sequence for communication system of FIG. 1.

An example command sequence is shown in FIG. 5. In this example sequence, information processing device 104 sends a HID (Human Interface Device) Command (ReportID: 0x01). When a remote control device 102 receives the HID command, the command is processed by the remote control device until a timing of the next HID slot. Remote control device 102 replies back to information processing device 104 by a HID Command (ReportID: 0x21) with the result of the command processing.

In one example command, information processing device 104 requests status information from remote control devices 102. In the case of the remote control devices 102-1 and 102-2 described above, the status information includes status information about the buttons, analog stick and 6-axis sensor thereof, for example. When a remote control device 102 and information processing device 104 are paired using the Bluetooth communication protocol, a 1 slot packet (2-DH1) is used for both HID output report and input report. Supported communication intervals include 5 milliseconds (msec), 10 msec, 15 msec and active.

FIG. 6A shows information about an example output report for the report ID 0x10 shown in FIG. 5. As shown in FIG. 6A, the supported Bluetooth intervals are 5 msec, 10 msec, 15 msec and active and the Bluetooth packet type is 2-DH1. The supported UART intervals are 5 msec, 10 msec, 15 msec. The command may also include up to eight (8) bytes for vibration motor-related information.

FIG. 6B shows information about an example input report for the report ID 0x20 shown in FIG. 5. As shown in FIG. 6B, the supported Bluetooth intervals are 5 msec, 10 msec, 15 msec and active and the Bluetooth packet type is 2-DH1. The supported UART intervals are 5 msec, 10 msec, and 15 msec. The packet includes (3) bytes for button status information, six (6) bytes for analog stick data, 36 bytes for 6-axis sensor information and one (1) byte for motor information. The packet also includes a one (1) byte HID sample number which is incremented for each HID packet. This sample number can be used, for example, in determining whether a packet(s) is lost. In a case of re-transmitting a packet, it is not necessary to increment this sample number. The packet can also include 3-bit battery level information and 1-bit charge information indicating whether the battery is currently being charged. Certain remote control devices 102 may be configured for physical attachment to information processing device 104 and the packet may include attachment detection information.

A non-limiting more detailed data format for the output report command is shown in FIG. 7A. With reference to FIG. 7A, byte 0 of the output report data format is a header and byte 1 is the report ID. Four (4) bits of byte 3 are the HID sample number and bytes 3-10 contain motor parameter information for vibration motor(s) in the remote control device. In particular, this vibration motor information may be used to control the vibration motor(s) in the remote control device to provide tactile output for a user holding the remote control device. Byte 11 may contain a command identifier and bytes 12-49 may include a command payload associated with the command corresponding to the command identifier.

A non-limiting more detailed data format for the input report is shown in FIG. 7B. This input report is the reply by the remote control device to the output report command shown in FIG. 7A. The timing of the reply is determined by the communication interval, e.g., 5 msec, 10 msec or 15 msec. The fields of the input report contain button information, stick information, sensor information, and the like that is current at the time the reply is sent. For example, button information, stick information, sensor information and the like is sampled at predetermined intervals and the result of the sampling may be stored in memory of the remote control device (e.g., memory 113 of remote control device 102-1 or memory 163 of remote control device 102-2). The sampling rate may, for example, be 5 msec, although the present disclosure is not limited in this respect. In some instances, the sampling rate may be determined based on the communication interval and there may be different sampling rates for different components. For example, the sampling rate for button and analog stick states may be sampled at one rate and the values for the inertial sensors may a sampled at a different rate. As will be discussed in greater detail below, in addition to sending current sample values for the acceleration sensor and the gyroscopic sensor, the data format disclosed herein also provides for sending at least two previous sample values for the acceleration sensor and the gyroscopic sensor. Thus, if sample $S3_a$ is the current sample value for the acceleration sensor, the data format provides for sending prior sample values $S2_a$ and $S1_a$ along with the current sample value. Similarly, if sample $S3_g$ is the current sample value for the angular velocity (gyroscope) sensor, the data format provides for sending prior sample values $S2_g$ and $S1_g$ along with the current sample value.

In this example embodiment, the data format of FIG. 7B is used for all types of remote control devices 102 that are communicating with the information processing device. For example, this data format is used for remote control devices 102-1 and 102-2, as well as for a single remote control device that includes some or all of the buttons, analog sticks and sensors of remote control devices 102-1 and 102-2. If a particular remote control device does not generate data corresponding to a particular field of the data format, the remote control device does not transmit data for that field. This may be accomplished, for example, by a transmitting a pre-determined value for the particular field (e.g., 0). The firmware for each respective remote control device may, for example, be configured to determine the configuration of the respective remote control device and to appropriately populate the information fields of FIG. 7B.

With reference to FIG. 7B, the input report includes 50 bytes, i.e., bytes 0 to 49. Byte 0 includes header information, byte 1 includes a report identifier and byte 2 includes the HID sample number. As discussed above, the HID sample number can be used by information processing device 104 to determine whether any reply packets are lost.

Byte 3 includes fields for a 3-bit value representing a current battery level of the remote control device, a 1-bit value representing whether the remote control is currently being charged (e.g., by physical attachment to a device configured to charge the remote control device), and a 3-bit and 1-bit value representing information about the physical attachment of the remote control device to some other device. For example, one or both of these values may represent a type of device to which the remote control device is attached (e.g., information processing device 104, a battery charger, etc.).

Bytes 4 through 6 include fields for various 1-bit values each representing a state of a button or stick corresponding to the field. For example, a first value ("1") may indicate that an input is currently supplied to a particular button/stick and a second value ("0") may indicate that no input is currently supplied to a particular button/stick. As mentioned above, not every remote control device will have buttons, etc. corresponding to each of these fields and, in this case, that remote control may, for example, transmit no data for any field corresponding to a button, etc. not present on that remote control device. In the FIG. 7B example, the 1-bit fields correspond to ZL, L, SR-1, SR-2, SL-1, SL-2, Left, Right, Up, Down, Plus, Minus, StickR (Right Stick), StickL (Left Stick), Home, Record, ZR, R, A, B, X, and Y buttons/ sticks described with reference to FIGS. 2 and 3 above. The 1-bit values also include a "powered" field representing whether power is being supplied to the circuits in the remote control device and a "null" or reserved field.

Bytes 7 through 12 includes fields for values associated with analog sticks 232 and 352. For example, the fields include a 12-bit value representing the tilt direction of stick 232, a 12-bit value representing the magnitude of the tilt of stick 232, a 12-bit value representing the tilt direction of stick 352, and a 12-bit value representing the magnitude of the tilt of stick 352. Remote control device 102-1 transmits no data for the fields corresponding to the tilt magnitude and direction for stick 352 and remote control device 102-2 transmits no data for the fields corresponding to the tilt magnitude and direction for stick 232. It will be readily apparent that because the stick values are 12-bit values, parts of each value will need to be sent in different bytes.

Byte 13 of the input report data format includes motor parameters for vibration motor(s) contained in the remote control device. These parameters may be 4-bit parameters and represent the current state of the motor(s).

Bytes 14-49 of the input report data format are for sending information corresponding to sensor values for the acceleration sensor and angular velocity sensor of the remote control device. With reference to FIG. 7B, bytes 14-19 represent an X-axis value of the acceleration sensor, a Y-axis value of the acceleration sensor, and a Z-axis value of the acceleration sensor. Similarly, bytes 20-25 represent an X-axis value of the angular velocity sensor, a Y-axis value of the angular velocity sensor, and a Z-axis value of the angular velocity sensor. In particular, bytes 14-25 represent values corresponding to sensor values sampled for the acceleration sensor and angular velocity sensor, respectively, at a current sample time.

Bytes 26-37 represent values corresponding to the sensor values for the acceleration sensor and angular velocity sensor, respectively, at a sample time prior to the current sample time (i.e., current sample time minus 1).

Bytes 38-49 represent values corresponding to the sensor values for the acceleration sensor and angular velocity sensor, respectively, at a sample time twice removed from the current sample time (i.e., current sample time minus 2).

More specifically, in a non-limiting example embodiment of the present disclosure, remote control devices 102-1 and 102-2 each acquires respective sample values for the accelerometer sensor and the angular velocity sensor every 5 milliseconds. In the data format of FIG. 7B, each of these remote control devices transmits to the information processing device 104 first sample values for the acceleration sensor and the angular velocity sensor acquired at a current timing, second sample values acquired 5 msec previously, and third sample values acquired 10 msec previously. Thus, each transmission from the remote control device includes three (3) sample values for the acceleration sensor and the angular velocity sensor. For the buttons, stick, and other information contained in bytes 3-13, each transmission from the remote control device includes one sample value corresponding to a current timing.

As noted above, different communication intervals (e.g., 5 msec, 10 msec or 15 msec) for communications between the remote control devices and the information processing device can be set based on, for example, the number of remote control devices communicating with the information processing device. Generally speaking, the more remote control devices communicating with the information processing device, the longer the communication interval. For example, when eight (8) remote control devices are communicating with the information processing terminal, the 15 millisecond communication interval may be set. The communication interval may also be set based on whether one or more remote control devices is communicating a large amount of data to the information processing device. For example, if one or more remote control devices is communicating information associated with an image captured by a camera of the remote control device (using a report other than that shown in FIG. 7B), a longer communication interval may be set. The communication interval may also be set in consideration of the type of application program being executed by information processing device 104.

TABLE I below illustrates transmitting sample values for an acceleration sensor or a gyroscope in accordance with the data format of FIG. 7B with a communication interval of 15 msec. For purposes of the discussion below with reference to TABLES I, II and II, acceleration sensor values are described, but the explanation applies equally to angular velocity sensor values. The discussion below assumes that the acceleration sensor values are sampled every 5 msec.

In particular, at 5 msec after receiving the output report command, the remote control device obtains a sample value S1 of the acceleration sensor and transmits this acceleration sensor value with an initial HID sample value (e.g., 0). Because this is the first sample value, there are no previous acceleration sensor values. Hence, the other acceleration sensor value fields in the data format of FIG. 7B are set to null values (e.g., 0).

In accordance with the communication interval of 15 msec, the next transmission from the remote control device is at 20 msec. Because the sampling interval for acceleration sensor values is 5 msec, a sample S2 at 10 msec and a sample S3 at 15 msec are obtained and stored in the memory of the remote control device. At the time of the next transmission (i.e., 20 msec), a current sample value of the acceleration sensor (S4) is transmitted, along with the sample values S2 and S3, with a HID sample value of 1.

After the 20 msec transmission, the next transmission from the remote control device is at 35 msec. Because the sampling interval for acceleration sensor values is 5 msec, a sample S5 at 25 msec and a sample S6 at 30 msec are obtained and these sample values are stored in the memory of the remote control device. At the time of the next transmission (i.e., 35 msec), a current sample value of the acceleration sensor (S7) is transmitted, along with the sample values S5 and S6, with a HID sample value of 2.

After the 35 msec transmission, the next transmission from the remote control device is at 50 msec. Because the sampling interval for acceleration sensor values is 5 msec, a sample S8 at 40 msec and a sample S9 at 45 msec are obtained and these sample values are stored in the memory of the remote control device. At the time of the next transmission (i.e., 50 msec), a current sample value of the acceleration sensor (S10) is transmitted, along with the sample values S8 and S9, with a HID sample value of 3.

TABLE I (15 millisecond communication interval)

| Time (msec) | Sample value | HID sample value | Packet |
|---|---|---|---|
| 5 | S1 | 0 | null, null, S1 |
| 10 | S2 | — | — |
| 15 | S3 | — | — |
| 20 | S4 | 1 | S2, S3, S4 |
| 25 | S5 | — | — |
| 30 | S6 | — | — |
| 35 | S7 | 2 | S5, S6, S7 |
| 40 | S8 | — | — |
| 45 | S9 | — | — |
| 50 | S10 | 3 | S8, S9, S10 |

TABLE II below illustrates transmitting sample values for an acceleration sensor in accordance with the data format of FIG. 7B with a communication interval of 10 msec.

In particular, at 5 msec after receiving the output report command, the remote control device obtains a sample value S1 of the acceleration sensor and transmits this acceleration sensor value with an initial HID sample value (e.g., 0). Because this is the first sample value, there are no previous acceleration sensor values. Hence, the other acceleration sensor value fields in the data format of FIG. 7B are set to null values.

In accordance with the communication interval of 10 msec, the next transmission from the remote control device is at 15 msec. Because the sampling interval for acceleration sensor values is 5 msec, a sample S2 at 10 msec is obtained and this sample value is stored in the memory of the remote control device. At the time of the next transmission (i.e., 15 msec), a current sample value of the acceleration sensor (S3) is transmitted, along with the sample values S2 and S1, with a HID sample value of 1.

After the 15 msec transmission, the next transmission from the remote control device is at 25 msec. Because the sampling interval for acceleration sensor values is 5 msec, a sample S4 at 20 msec is obtained and this sample value is stored in memory of the remote control device. At the time of the next transmission (i.e., 25 msec), a current sample value of the acceleration sensor (S5) is transmitted, along with the sample values S4 and S3, with a HID sample value of 2.

After the 25 msec transmission, the next transmission from the remote control device is at 35 msec. Because the sampling interval for acceleration sensor values is 5 msec, a sample S6 at 30 msec is obtained and this sample value is stored in the memory of the remote control device. At the time of the next transmission (i.e., 35 msec), a current sample value of the acceleration sensor (S7) is transmitted, along with the sample values S6 and S5, with a HID sample value of 3.

After the 35 msec transmission, the next transmission from the remote control device is at 45 msec. Because the sampling interval for acceleration sensor values is 5 msec, a sample S8 at 40 msec is obtained and this sample value is stored in the memory of the remote control device. At the time of the next transmission (i.e., 45 msec), a current sample value of the acceleration sensor (S9) is transmitted, along with the sample values S8 and S7, with a HID sample value of 4.

TABLE II (10 millisecond communication interval)

| Time (msec) | Sample value | HID sample value | Packet |
|---|---|---|---|
| 5 | S1 | 0 | null, null, S1 |
| 10 | S2 | — | — |
| 15 | S3 | 1 | S1, S2, S3 |
| 20 | S4 | — | — |
| 25 | S5 | 2 | S3, S4, S5 |
| 30 | S6 | — | — |
| 35 | S7 | 3 | S5, S6, S7 |
| 40 | S8 | — | — |
| 45 | S9 | 4 | S7, S8, S9 |
| 50 | S10 | — | — |

TABLE III below illustrates transmitting sample values for an acceleration sensor in accordance with the data format of FIG. 7B with a communication interval of 5 msec.

In particular, at 5 msec after receiving the output report command, the remote control device obtains a sample value S1 of the acceleration sensor, stores the sample value in memory, and transmits this acceleration sensor value with an initial HID sample value (e.g., 0). Because this is the first sample value, there are no previous acceleration sensor values. Hence, the other acceleration sensor value fields in the data format of FIG. 7B are set to null values.

In accordance with the communication interval of 5 msec, the next transmission from the remote control device is at 10 msec. Because the sampling interval for acceleration sensor values is 5 msec, a current sample value of the acceleration sensor (S2) is transmitted, along with the sample values S1, with a HID sample value of 1. Because this is the only second sample value, the acceleration sensor value fields for the third sample in the data format of FIG. 7B are set to null values.

After the 10 msec transmission, the next transmission from the remote control device is at 15 msec. Because the sampling interval for acceleration sensor values is 5 msec, a current sample value of the acceleration sensor (S3) is transmitted, along with the sample values S2 and S1, with a HID sample value of 2.

After the 15 msec transmission, the next transmission from the remote control device is at 20 msec. Because the sampling interval for acceleration sensor values is 5 msec, a current sample value of the acceleration sensor (S4) is transmitted, along with the sample values S3 and S2, with a HID sample value of 3.

After the 20 msec transmission, the next transmission from the remote control device is at 25 msec. Because the sampling interval for acceleration sensor values is 5 msec, a current sample value of the acceleration sensor (S5) is transmitted, along with the sample values S4 and S3, with a HID sample value of 4.

After the 25 msec transmission, the next transmission from the remote control device is at 30 msec. Because the sampling interval for acceleration sensor values is 5 msec, a current sample value of the acceleration sensor (S6) is transmitted, along with the sample values S5 and S4, with a HID sample value of 5.

After the 30 msec transmission, the next transmission from the remote control device is at 35 msec. Because the sampling interval for acceleration sensor values is 5 msec, a current sample value of the acceleration sensor (S7) is transmitted, along with the sample values S6 and S5, with a HID sample value of 6.

After the 35 msec transmission, the next transmission from the remote control device is at 40 msec. Because the sampling interval for acceleration sensor values is 5 msec, a current sample value of the acceleration sensor (S8) is transmitted, along with the sample values S7 and S6, with a HID sample value of 7.

After the 40 msec transmission, the next transmission from the remote control device is at 45 msec. Because the sampling interval for acceleration sensor values is 5 msec, a current sample value of the acceleration sensor (S9) is transmitted, along with the sample values S8 and S7, with a HID sample value of 8.

After the 45 msec transmission, the next transmission from the remote control device is at 50 msec. Because the sampling interval for acceleration sensor values is 5 msec, a current sample value of the acceleration sensor (S10) is transmitted, along with the sample values S9 and S8, with a HID sample value of 9.

TABLE III (5 millisecond communication interval)

| Time (msec) | Sample value | HID sample value | Packet |
|---|---|---|---|
| 5 | S1 | 0 | null, null, S1 |
| 10 | S2 | 1 | Null, S1, S2 |
| 15 | S3 | 2 | S1, S2, S3 |
| 20 | S4 | 3 | S2, S3, S4 |
| 25 | S5 | 4 | S3, S4, S5 |
| 30 | S6 | 5 | S4, S5, S6 |
| 35 | S7 | 6 | S5, S6, S7 |
| 40 | S8 | 7 | S6, S7, S8 |
| 45 | S9 | 8 | S7, S8, S9 |
| 50 | S10 | 9 | S8, S9, S10 |

As can be seen with reference to the above tables, when a 5 msec communication interval is set, the disclosed data format results in each sample value being transmitted three times. For example, sample value S4 is transmitted in the packets associated with HID values 3, 4 and 5. Thus, if the packet at 20 msec is lost, the information processing device can restore the S4 sample value using the packet transmitted at 25 msec. If both the packets at 20 msec and at 25 msec are lost, the information processing device can restore the S4 sample value using the packet transmitted at 30 msec. Thus, for the 5 msec communication interval, the information processing device can restore a sample value even if two packets are lost. Indeed, the information processing device can obtain complete data for sample values S1, S2, S3, S4, S5 and S6 even if both the packets at 20 msec and 25 msec were to be lost or not received.

In the 10 msec interval, certain sample values are transmitted twice. For example, sample value S3 is contained in the packets transmitted at 15 msec and at 25 msec. Thus, in this instance, the disclosed data format allows recovery of at least some information when a packet is lost.

In the 15 msec communication interval, each sample value is communicated only once and the sample values cannot be restored if a packet is lost.

As noted above, the information processing device can determine whether a packet is lost based on the HID sample number included in the packets transmitted from the remote control devices to the information processing device. With reference to the data format of FIG. 7B, 7 bits are allocated for the HID sample number and thus the HID sample number can assume values from 0-255.

As processing of the sensor values from the acceleration sensor and the angular velocity sensor by the information processing device proceeds, multiple sensor values are often accumulated for calculation purposes. These accumulated values can allow for better calculation of aspects of movement and orientation of the remote control device. Consequently, even loss of one packet can change the calculated orientation/movement result significantly. This is different than the information for a button press in which the loss of one packet typically does not affect the processing of the information processing device as much. Thus, the data format and the variable communication intervals described herein allow for improved inertial sensor calculations even when packets are lost. As discussed above, in the case of the 5 msec communication interval, the disclosed data format allows for recovery of all inertial sensor values even when two consecutive packets are lost.

Figure 8:
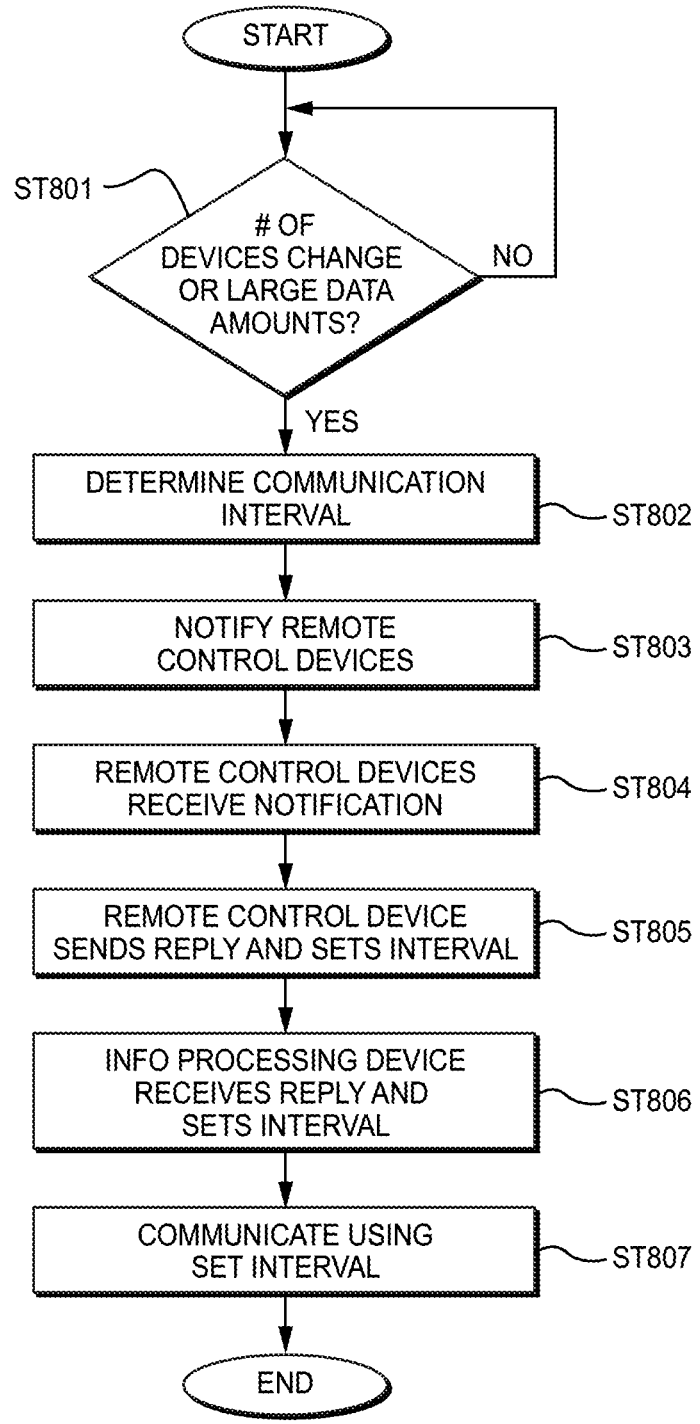
FIG. 8 is a flow chart illustrating a non-limiting example method for setting the communication interval for communication between a remote control device and an information processing device.

An example process for setting the communication interval will now be described with reference to FIG. 8. At ST 801, information processing device 104 checks whether the number of remote control devices communicating with the information processing device changes or one of the remote control devices begins to communicate large amounts of data to the information processing device. If not, ST 801 is repeated. If so, the information processing device determines the communication interval (e.g., 5 msec, 10 msec or 15 msec) at ST 802 based on the number of remote control devices in communication with the information processing device and/or the amount/type of information to be communicated from one or more of the information processing devices and/or the type of program being executed. As noted above, generally speaking, the more remote control devices in communication with the information processing device, the longer the communication interval. Similarly, the more data to be communicated to the information processing device, the longer the communication interval.

At ST 803, the information processing device notifies the remote control devices of the determined communication interval. At ST 804, the remote control device receives the information about the determined communication interval from the information processing device and at ST 805 sends a response to the information processing device. The remote control device also sets itself to communicate at the communication interval at ST 805. The information processing device receives the response from the remote control device at ST 806 and sets the communication interval. Thereafter, at ST 807, the information processing device and the remote control device communicate with each other using the set communication interval.

Although example embodiments of the present disclosure have been illustrated and described hereinabove, the present disclosure is not limited to the above-mentioned specific example embodiments, but may be variously modified by those skilled in the art to which the present disclosure pertains without departing from the scope and spirit of the disclosure as disclosed in the accompanying claims. These modifications should also be understood to fall within the scope of the present disclosure.

What is claimed is:
1. A system comprising:
first and second remote control devices, each of the first and second remote control devices comprising:
an inertial sensor;
first wireless communication circuitry; and
control circuitry configured to:
receive, from the inertial sensor, sample values associated with aspects of orientation and/or motion of the remote control device, each sample value corresponding to a different sampling time; and control transmitting the sample values, via the first wireless communication circuitry, in communications at a specified communication interval, wherein the control circuitry is configured to, based on the specified communication interval being a first communication interval, control transmitting consecutive communications including a first communication and a second communication, the first communication including first and second different ones of the sample values, and the second communication including the second sample value and a third one of the sample values different from both the first and the second sample values; and an electronic device controllable based on orientation and/or motion of each of the first and second remote control devices, the electronic device comprising second wireless communication circuitry configured to receive the communications including the sample values from each of the first and second remote control devices and a processor configured to control the electronic device based at least in part on the received communications.

2. The system according to claim 1, wherein the control circuitry is configured to, based on the specified communication interval being a second communication interval different from the first communication interval, control transmitting consecutive communications including a third communication, a fourth communication, and a fifth communication, the third communication including fourth, fifth, and sixth different ones of the sample values; the fourth communication including the fifth and the sixth sample values and a seventh one of sample values different from both the fifth and the sixth sample values; and the fifth communication including the sixth and the seventh sample values and an eighth one of the sample values different from both the sixth and the seventh sample values.

3. The system according to claim 2, wherein the second communication interval is shorter than the first communication interval.

4. The system according to claim 1, wherein the control circuitry of each of the first and second remote control devices is further configured to:

based on the specified communication interval being a second communication interval different from the first communication interval, control transmitting consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and the seventh sample values; and based on the specified communication interval being a third communication interval different from both the first and second communication intervals, control transmitting consecutive communications so that no same respective one of the sample values is included in consecutive ones of the communications.

5. The system according to claim 4, wherein the first communication interval is longer than the second communication interval and the third communication interval is longer than the first communication interval.

6. A remote control device, comprising:
an inertial sensor;
one or more manipulable input devices;
first wireless communication circuitry; and
control circuitry configured to:
receive, from the inertial sensor, sample values associated with aspects of orientation and/or motion of the remote control device, each sample value corresponding to a different sampling time; and control transmitting the sample values, via the first wireless communication circuitry, in communications at a specified communication interval, wherein the control circuitry is configured to, based on the specified communication interval being a first communication interval, control transmitting consecutive communications including a first communication and a second communication, the first communication including first and second different ones of the sample values, and the second communication including the second sample value and a third one of the sample values different from both the first and second sample values.

7. The remote control device according to claim 6, wherein the control circuitry is configured to, based on the specified communication interval being a second communication interval different from the first communication interval, control transmitting consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and seventh sample values.

8. The remote control device according to claim 7, wherein the second communication interval is shorter than the first communication interval.

9. The remote control device according to claim 8, wherein the first communication interval is 10 milliseconds and the second communication interval is 5 milliseconds.

10. The remote control device according to claim 6, wherein the control circuitry is further configured to:

based on the specified communication interval being a second communication interval different from the first communication interval, control transmitting consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and the seventh sample values; and based on the specified communication interval being a third communication interval different from both the first and second communication intervals, control transmitting consecutive communications so that no same respective one of the sample values is included in consecutive ones of the communications.

11. The remote control device according to claim 10, wherein the first communication interval is longer than the second communication interval and the third communication interval is longer than the first communication interval.

12. The remote control device according to claim 11, wherein the first communication interval is 10 milliseconds, the second communication interval is 5 milliseconds, and the third communication interval is 15 milliseconds.

13. The remote control device according to claim 6, wherein the control circuitry is configured to specify the communication interval based on a command from an electronic device.

14. The remote control device according to claim 6, wherein the control circuitry is configured to receive input device information from the one or more user manipulable input devices and control transmitting the input device information in the communications.

15. A system comprising:
at least one remote control device according to claim 6; and
an electronic device controllable based on an orientation and/or motion of the at least one remote control device, the electronic device comprising second wireless communication circuitry configured to receive the communications from the remote control device and a processor configured to control the electronic device based at least in part on the received communications.

16. The system according to claim 15, wherein the electronic device comprises a video game device.

17. The system according to claim 15, wherein the at least one remote control device comprises two remote control devices.

18. The system according to claim 17, wherein each of the two remote control devices is configured for selective physical attachment to and detachment from the electronic device.

19. The system according to claim 18, wherein each of the two remote control devices is configured for selective physical attachment to and detachment from a respective one of opposite sides of the electronic device.

20. The system according to claim 15, wherein the electronic device includes a built-in display.

21. A method of communicating information to an electronic device from a remote control device comprising an inertial sensor; one or more manipulable input devices; and wireless communication circuitry, the method comprising:
receiving, from the inertial sensor, sample values associated with aspects of orientation and/or motion of the remote control device, each sample value corresponding to a different sampling time; and
wirelessly transmitting the sample values in communications at a specified communication interval,
wherein, based on the specified communication interval being a first communication interval, wirelessly transmitting consecutive communications including a first communication and a second communication, the first communication including first and second different ones of the sample values, and the second communication including the second sample value and a third one of the sample values different from both the first and the second sample values.

22. The method according to claim 21, wherein, based on the specified communication interval being a second communication interval different from the first communication interval, wirelessly transmitting consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and the seventh sample values.

23. The method according to claim 22, wherein the second communication interval is shorter than the first communication interval.

24. The method according to claim 21, wherein
based on the specified communication interval being a second communication interval different from the first communication interval, wirelessly transmitting consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and the seventh sample values; and
based on the specified communication interval being a third communication interval different from both the first and second communication intervals, wirelessly transmitting consecutive communications so that no same respective one of the sample values is included in consecutive ones of the communications.

25. The method according to claim 24, wherein the first communication interval is longer than the second communication interval and the third communication interval is longer than the first communication interval.

26. A non-transitory computer-readable medium storing instructions for communicating information from a remote control device comprising an inertial sensor; one or more manipulable input devices; and wireless communication circuitry, the instructions, when executed by control circuitry of the remote control device, causing the remote control device to at least:
receive, from the inertial sensor, sample values associated with aspects of orientation and/or motion of the remote control device, each sample value corresponding to a different sampling time; and
wirelessly transmit the sample values in communications at a specified communication interval,
wherein, based on the specified communication interval being a first communication interval, the instructions cause the remote control device to wirelessly transmit consecutive communications including a first communication and a second communication, the first communication including first and second different ones of the sample values, and the second communication including the second sample value and a third one of the sample values different from both the first and the second sample values.

27. The non-transitory computer-readable medium according to claim 26, wherein, based on the specified communication interval being a second communication interval different from the first communication interval, the instructions cause the remote control device to wirelessly transmit consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and the seventh sample values.

28. The non-transitory computer-readable medium according to claim 27, wherein the second communication interval is shorter than the first communication interval.

29. The non-transitory computer-readable medium according to claim 26, wherein based on the specified communication interval being a second communication interval different from the first communication interval, the instructions cause the remote control device to wirelessly transmit consecutive communications including a third communication, a fourth communication, and a fifth communication, the third communication including fourth, fifth, and sixth different ones of the sample values; the fourth communication including the fifth and the sixth sample values and a seventh one of the sample values different from both the fifth and the sixth sample values; and the fifth communication including the sixth and the seventh sample values and an eighth one of the sample values different from both the sixth and the seventh sample values; and based on the specified communication interval being a third communication interval different from both the first and second communication intervals, the instructions cause the remote control device to wirelessly transmit consecutive communications so that no same respective one of the sample values is included in consecutive ones of the communications.

30. The non-transitory computer-readable medium according to claim 29, wherein the first communication interval is longer than the second communication interval and the third communication interval is longer than the first communication interval.

\* \* \* \* \*